United States Patent [19]

Wachtel et al.

[11] 4,260,531

[45] Apr. 7, 1981

[54] INK COMPOSITION FOR PRINTING ON POLYOLEFIN

[75] Inventors: Joseph Wachtel, Buffalo Grove; Josephine Aguilar, Elk Grove Village, both of Ill.

[73] Assignee: A. B. Dick Company, Niles, Ill.

[21] Appl. No.: 53,818

[22] Filed: Jul. 2, 1979

[51] Int. Cl.³ .............................................. C08L 33/08
[52] U.S. Cl. ................................................. 260/29.6 E
[58] Field of Search .............. 260/29.6 NR, 29.6 RW, 260/29.6 RB, 29.6 WB, 29.6 E, 29.6 ME

[56] References Cited

U.S. PATENT DOCUMENTS

| | | | |
|---|---|---|---|
| 3,328,325 | 6/1967 | Zdanowski | 260/29.6 WB |
| 3,903,034 | 9/1975 | Zabiak | 260/29.6 WB |
| 4,059,554 | 11/1977 | Pacansky | 260/29.6 NR |
| 4,111,878 | 9/1978 | Ruhf | 260/29.6 RB |
| 4,153,593 | 5/1979 | Zabiak | 260/29.6 ME |
| 4,163,001 | 7/1979 | Carumpalos | 260/29.6 RB |

*Primary Examiner*—Paul R. Michl
*Attorney, Agent, or Firm*—McDougall, Hersh & Scott

[57] ABSTRACT

A jet printing ink composition for printing on treated or untreated surfaces of polyolefin plastics such as polyethylene and polypropylene in which the ink composition has a pH within the range of 7.0–10.5 and which is formulated to contain 5–20% by weight styrene-acrylic copolymer resin, 3–12 parts by weight plasticizer per 100 parts by weight of resin, 0–20 parts by weight modifying resin per 100 parts by weight of resin, 0.5–6% by weight colorant, 0–10% by weight evaporation retardant, the remainder being water and $C_1$–$C_3$ alcohol in the ratio of 80–10 parts by weight alcohol to 20–90 parts by weight water.

12 Claims, No Drawings

INK COMPOSITION FOR PRINTING ON POLYOLEFIN

This invention relates to jet printing ink compositions and particularly to jet inks for printing on smooth surfaces of plastic materials, such as polyethylene, polypropylene and other polyolefins such as polybutylene or copolymers of these, with or without surface treatment of the plastic surface to enhance the anchorage by adhesion of the ink characters.

Jet printing uses controlled droplets to print letters, numbers or bars, etc. The sum total of the droplets used, form the characters wanted. If the size of the spot created by the ink droplet is not controlled, it may become too small or too large because of the surface wetting tension of the substrate. Under those conditions the character printed can be unreadable.

Printing on paper generally does not create a problem in this area since the "drying" is done by absorption and the spot size is controlled by the rate of penetration of the substrate.

On non-absorptive substrates the water, or solvent used does not disappear from the print by absorption, instead it is evaporated from the surface. Because of this, the spot size is generally controlled by the comparable surface tension of the liquid and the surface wetting tension of the substrate as measured by ASTM method D2578-67. By controlling the surface tension of the ink for a particular surface, the spot size can normally be controlled in the area that gives satisfactory printing appearance.

A major difficulty has been encountered in the printing of polyolefins, or any other plastic substrate that is changed by treatment. Polyethylene and polypropylene, among other materials, are normally unprintable without some change of the surface. The surface of the plastic is, therefore, treated before printing. The treatment of polyolefins is accomplished by affecting the surface to be printed by chemicals, flame or corona discharge.

Since dwell time under corona discharge is easily controlled, plastic films are normally treated this way, and the treatment level is controlled to give surface wetting tension of 35-40 dynes. Heavier plastic materials, such as various shaped bottles, are not treated this way. Because of their irregular shapes they are passed through the oxiding part of a flame. Because of their irregular shapes the treatment level is therefore variable over the container surface. A series of containers made of polyolefins by a single supplier showed treatment levels varying from 31 to above 56 centimeter, as measured by ASTM D2578-67 with specified solvents.

For example, on untreated polyethylene bottles (approximately 31 dynes per centimeter wetting tension), a normally used jet ink will have a spot size of 0.013-0.017 inches, while the same ink on highly treated polyethylene or polypropylene (above 56 dynes per centimeter) will have a spot size as great as 0.040 inches. This prevents a packager from using the same jet ink on differently treated bottles and even creates problems on different areas of the same type bottles.

It is an object of this invention to produce and to provide a method for producing jet printing ink compositions in which the spot size can be controlled or restricted to desired levels and which adhere to plastic surfaces with or without pre-treatment, thereby to enable jet printed characters to be obtained on even or uneven, shaped or flat plastic surfaces, which makes use of a reduced ratio of organic solvent to water, and which is still characterized by reasonable drying time.

The following example is illustrative of a jet printing ink composition embodying the features of this invention.

EXAMPLE 1

|  | % |
|---|---|
| Joncryl 67 | 10.00 |
| Aqueous Ammonium Hydroxide (28-30%) | 2.35 |
| Water | 37.90 |
| Methanol | 41.50 |
| Dibutyl Phthalate | .50 |
| Ethylene Glycol Mono Ethyl Ether | 5.00 |
| Diethylene Glycol Mono Ethyl Ether | 1.50 |
| Basic Violet 3 | 1.25 |

Joncryl 67 which is marketed by S. C. Johnson and Sons of Racine, Wis. is a styrene-acrylic acid water saponifiable copolymer formed by polymerization of styrene and acrylic acid in the ratio of 2 moles styrene to about 1 mole acrylic acid. While Joncryl 67 represents the preferred binder component, other water saponifiable, alcohol soluble styrene-acrylic acid or alkyl acrylate acid can be used. The amount of such resinous binder can be varied within the range of 5-20% by weight of the ink composition but it is preferred to make use of an amount within the range of 8.5-11% by weight of the ink composition.

The dibutyl phthalate performs as a plasticizer for the resinous component in the ink composition. Instead of dibutyl phthalate, other well known plasticizing agents can be used in addition to or in substitution for the dibutyl phthalate, such as o, p, toluene sulfonamides, marketed by Monsanto Chemical Company under the designation Santicizer 8 or Santicizer 9; toluene sulfonamide formaldehyde resins such as marketed by Monsanto Chemical Company under the trade name Santolite MHP, or other well known phthalates, glycolates, such as bi-phthalyl butyl glycolate, citrates, phosphates, such as tributyl phosphates and the like. While such plasticizing agents, may or may not be employed, depending somewhat on the hardness of the resinous binder component, with the preferred Joncryl 67 type resins, such plasticizing agents can be employed in an amount within the range of 3-12% by weight and preferably 4-7% by weight of the resin.

Adhesion of the printed character to the surfaces of plastic materials can generally be improved by the inclusion with the styrene-acrylic acid resin, such polymers or copolymers which are soluble in aqueous ammonia and alcohol, as represented by copolymers of polyvinyl acetate, styrene maleic anhydride copolymer resins polymers such as polyvinyl pyrrolidone, rosin esters such as pentaethrytol esters of rosin and natural resins such as shellac and the like. Such adhesion improvers can beneficially be included in the jet printing ink composition of this invention in an amount within the range of 0-20% by weight of the resinous binder component and preferably in an amount within the range of 1-10% by weight of the resinous binder component.

Basic violet 3 can be substituted in whole or in part with other colorants such as may be selected from the series of well known acid, basic, or solvent dyestuffs and mixtures thereof, the selection of which depends somewhat on the non-volatile components and the water to alcohol ratio in the jet printing ink composition. Any dye component that is soluble in water with a tolerance or a solubility in alcohol, or which is soluble in alcohol and has a tolerance for moderate amounts of water can be used as a colorant in the ink compositions embodying the features of this invention. Representative of the dyestuffs that can be used are:

Basic Violet: 10
Basic Violet: 3
Acid Red: 73
Acid Orange: 10
Acid Blue: 9
Acid Black: 1
Solvent Orange: 3
Solvent Blue: 38
Solvent Brown: 20

Suitable printing ink compositions embodying the features of this invention can be formulated with colorant dyestuffs prepared in an amount within the range of 0.5–6% by weight and preferably 1.0–4% by weight of the ink composition.

The ethylene glycol mono ethyl ether (Cellosolve—Union Carbide) and the diethylene glycol mono ethyl ether (Carbitol—Union Carbide) function in the ink composition to retard evaporation. The ethylene glycol mono ethyl ether and/or diethylene glycol mono ethyl ether can be substituted in whole or in part with other Cellosolve or Carbitol compounds or other well known alcohol or water soluble evaporation retardants. The amount of retardant can range from 0–10% by weight of the ink composition but it is preferred to make use of the retardant in an amount within the range of 5–7.5% by weight of the composition, unless the daily shutdowns of the printer exceeds 8 hours. In such event the retardant is preferably formulated into an ink composition in an amount within the range of 4–10% by weight.

The ink composition embodying the features of this invention encompass low as well as high levels of water content. As a result, in order to provide for long term stability, it is important to include a basic reagent in the ink composition to insure that the resinous binders and modifications remain soluble throughout the range of water content and throughout the period of storage and use. For this purpose, it is desirable to maintain the pH of the ink composition between 7.5 and 10. Although use can be made of such inorganic bases as represented by sodium hydroxide and potassium hydroxide, their presence in the printed character leads to poor water resistance after drying. It is preferred to make use of an organic base which can be eliminated by evaporation. Best use is made of a pH controlling agent that evaporates rapidly to accelerate development of water resistance upon aging. Thus, while use can be made of organic amines, it is preferred to make use of ammonium hydroxide for controlling pH within the desired range of 7.5-10. Morpholine can also be used for long term stability during storage of the ink composition.

In accordance with the practice of this invention, the diluent, which makes up the remainder of the ink composition, constitutes a mixture of water and one or more water miscible $C_1$-$C_3$ alcohols, as represented by methyl, ethyl, isopropyl and n-propyl alcohols. The ratio of water and alcohol can be varied over a fairly wide range from 10–80 parts by weight alcohol to 90–20 parts by weight water. The ratio selected depends on the drying time available and the estimates set by the environmental protection agency for the evolution of organic solvents into the atmosphere.

The following are further examples of jet printing ink compositions embodying the features of this invention and which are illustrative of some of the above variables.

Example 2 illustrates the inclusion of a modifying resin and the substitution of basic violet 10 as the colorant.

EXAMPLE 2

|  | % |
| --- | --- |
| Water | 37.70 |
| Aqueous Ammonium Hydroxide (28–30%) | 2.30 |
| Joncryl 67 | 9.00 |
| Pentalyn 255* | 1.00 |
| Methanol | 41.50 |
| Santicizer B-16** | .50 |
| Ethylene Glycol Mono Ethyl Ether | 5.00 |
| Diethylene Glycol Mono Ethyl Ether | 1.50 |
| Basic Violet 10 | 1.50 |

**Butyl-phythalyl butyl glycolate - Monsanto Chemical
*Pentaethrytol ester of Rosin - Hercules Chemical Co.

Example 3 illustrates a composition in which three different dye stuffs makes up the coloring agent.

EXAMPLE 3

|  | % |
| --- | --- |
| Water | 33.90 |
| Aqueous Ammonium (28–30% NHyOH) | 2.10 |
| Joncryl 67 | 9.00 |
| Tributyl Phosphate | .60 |
| Methanol | 44.10 |
| "Cellosolve" | 6.00 |
| "Carbitol" | .50 |
| Solvent Blue 38 | 2.70 |
| Solvent Orange 3 | .60 |
| Basic Violet 10 | .50 |

Example 4 illustrates the use of polyvinyl pyrrolidone as an adhering modifier and sodium hydroxide for pH control whereby the resulting print can be easily washed off with soap and water.

EXAMPLE 4

| Water | 38.65 |
| --- | --- |
| Sodium Hydroxide | 1.10 |
| Aqueous Ammonium Hydroxide (28–30%) | .25 |
| Polyvinylpyrrolidone | 1.00 |
| Joncryl 67 | 9.00 |
| Dibutyl Phthalate | .50 |
| Methanol | 41.50 |
| Ethylene Glycol Mono Ethyl Ether | 5.00 |
| Diethylene Glycol Mono Ethyl Ether | 1.50 |
| Basic Violet 10 | 1.50 |

Example 5 illustrates an ink composition with a high water to alcohol ratio. This is a slower drying formulation but gives very low levels of pollution.

EXAMPLE 5

|  | % |
| --- | --- |
| Water | 71.15 |
| Aqueous Ammonium Hydroxide (28–30%) | 2.35 |
| Joncryl 67 | 10.00 |
| n-propanol | 8.00 |

-continued

|  | % |
|---|---|
| Dibutyl Phthalate | 0.50 |
| Ethylene glycol mono ethyl ether | 5.00 |
| Duthylene glycol mono ethyl ether | 1.50 |
| Solvent Blue 38 | 1.50 |

By the use of the combination of water and alcohol as diluent, in accordance with the practice of this invention, it has become possible to develop an ink that adheres to plastic surfaces, treated or untreated, with reasonable drying time and with controlled spot size. These characteristics have not been available with present jet printing inks.

Comparison has been made with normally used jet printing inks in the printing of treated and untreated bottles of polyethylene using a "Videojet" printer having an orifice of 2.5 mils. On the bottle of untreated polyethylene (approximately 31 dynes/cm wetting tension), the normally used jet printing ink gave a spot size of 0.013-0.017 inches. The same ink on highly treated polyethylene (above 56 dynes/cm), gave a spot size as great as 0.040 inches. By comparison, jet printing inks embodying the features of this invention, as represented by example 1, gave a spot size of approximately 0.013-0.018 inches with both the treated and untreated bottles as well as in the variable surfaces therein. Thus, ink compositions embodying the features of this invention will enable packagers to save the expense and problems arising from the need to use different inks with differently treated plastic bottles, as would be required with normal jet printing ink compositions and the packagers are also saved from the problems arising from variation in spot size on different areas of the same bottle.

The ink compositions formulated with the practice of this invention met the requirements for use in a jet printer namely:

|  | Broad Range | Preferred Range |
|---|---|---|
| Viscosity (20° C.) CPS | 1.0 –15.0 | 1.5–7.0 |
| Electrical resistivity ohm-cm | <3000 | <2000 |
| Surface tension dynes/cm | 22.5–60 | 23.5–37 |
| Sonic viscosity meters/sec | 1200–1800 | 1200–1600 |
| Specific gravity | .800–1.045 | .850–1.010 |

While the invention has been described with reference to an ink composition for jet printing onto surfaces of treated or untreated polyethylene and polypropylene and the like polyolefin plastics, it will be understood that the ink composition of this invention gave good adhesion to other surfaces thereby to enable use as a printing ink applicable to such other surfaces by jet printing or by other printing methods.

It will be understood that changes may be made in the details of formulation and materials without departing from the spirit of the invention, especially as defined in the following claims.

We claim:

1. A jet printing ink composition having a pH within the range of 7.0–10.5 in which the printing ink composition contains 5–20% by weight styrene-acrylic copolymer resin, 3–12 parts by weight plasticizer per 100 parts by weight resin, 0–20 parts by weight modifying resin per 100 parts by weight of resin, 0.5–6% by weight colorant, 0–10% by weight evaporation retardant, the remainder being water and alcohol in the ratio of 80–10 parts by weight alcohol to 20–90 parts by weight water, in which the alcohol is selected from the group consisting of methanol, ethanol, isopropyl alcohol and n-propyl alcohol.

2. A printing ink composition as claimed in claim 1 in which the styrene-acrylic copolymer resin is present in an amount within the range of 8.5–11% by weight, the plasticizer is present in an amount within the range of 4–7 parts by weight per 100 parts by weight of resin, the modifying resin is present in an amount within the range of 0–10 parts by weight per 100 parts by weight of resin, the colorant is present in an amount within the range of 1–4% by weight of the ink composition, and the evaporation retardant is present in an amount within the range of 5.0–7.5% by weight.

3. A printing ink composition as claimed in claim 1 in which the plasticizer is selected from the group consisting of alkyl phthalates, o, p, toluene sulphonamides, toluene sulfonamide formaldehyde resin, alkyl phosphates and alkyl glycolates.

4. A printing ink composition as claimed in claim 1 in which the modifying resin is selected from the group consisting of polyvinyl acetate copolymer, styrene maleic anhydride copolymer, rosin esters and natural resins.

5. A printing ink composition as claimed in claim 1 in which the modifying resin is polyvinylpyrrolidone.

6. A printing ink composition as claimed in claim 1 in which the colorant is an acid, basic, or solvent dyestuff which is soluble in water and has a tolerance for alcohol or which is soluble in alcohol and has a tolerance for moderate amounts of water.

7. A printing ink composition as claimed in claim 1 in which the retardant is selected from the group consisting of ethylene glycol mono alkyl ether and diethylene glycol mono alkyl ether.

8. A printing ink composition as claimed in claim 1 in which ammonium hydroxide is present for the solubility and adjustment of pH to within the desired range.

9. A printing ink composition as claimed in claim 1 in which an alkali metal hydroxide is present for solubility and the adjustment of pH to within the desired range.

10. A printing ink composition as claimed in claim 1 in which an organic amine is present for the solubility and adjustment of pH to within the desired range.

11. A printing ink composition as claimed in claim 1 which includes morpholine as the organic amine.

12. A printing ink composition as claimed in claim 1 in which the styrene-acrylic copolymer resin is a styrene-acrylic acid copolymer resin.

* * * * *

UNITED STATES PATENT OFFICE
CERTIFICATE OF CORRECTION

Patent No. 4,260,531        Dated April 7, 1981

Inventor(s) Joseph Wachtel and Josephine Aguilar

It is certified that error appears in the above-identified patent and that said Letters Patent are hereby corrected as shown below:

Col. 1, line 52, before "centimeter" insert -- dynes per -- .

Signed and Sealed this

Thirtieth Day of June 1981

[SEAL]

Attest:

RENE D. TEGTMEYER

Attesting Officer      Acting Commissioner of Patents and Trademarks